(12) United States Patent
Heo et al.

(10) Patent No.: US 12,087,081 B2
(45) Date of Patent: Sep. 10, 2024

(54) ELECTRONIC DEVICE INCLUDING FINGERPRINT SENSOR

(71) Applicant: Samsung Electronics Co., Ltd., Gyeonggi-do (KR)

(72) Inventors: Jihun Heo, Gyeonggi-do (KR); Hyunwoo Kim, Gyeonggi-do (KR); Jihoon Park, Gyeonggi-do (KR); Seungho Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

(21) Appl. No.: 17/747,210

(22) Filed: May 18, 2022

(65) Prior Publication Data

US 2023/0016223 A1 Jan. 19, 2023

Related U.S. Application Data

(63) Continuation of application No. PCT/KR2022/006934, filed on May 13, 2022.

(30) Foreign Application Priority Data

Jul. 13, 2021 (KR) ........................ 10-2021-0091720

(51) Int. Cl.
*G06V 40/13* (2022.01)
*G06F 1/16* (2006.01)
*G06F 3/041* (2006.01)
*G06F 3/042* (2006.01)

(52) U.S. Cl.
CPC ........ *G06V 40/1318* (2022.01); *G06F 1/1656* (2013.01); *G06F 3/0412* (2013.01); *G06F 3/0421* (2013.01); *G06F 2203/04103* (2013.01)

(58) Field of Classification Search
None
See application file for complete search history.

(56) References Cited

U.S. PATENT DOCUMENTS

| | | | |
|---|---|---|---|
| 2011/0026873 A1* | 2/2011 | Hodono | G02B 6/138 385/12 |
| 2014/0043772 A1 | 2/2014 | Isoda et al. | |
| 2015/0000837 A1* | 1/2015 | Kim | G06F 21/32 156/275.5 |
| 2015/0055292 A1 | 2/2015 | Lee et al. | |
| 2015/0070324 A1* | 3/2015 | Han | G06F 1/1626 345/175 |
| 2016/0282977 A1 | 9/2016 | Moua et al. | |
| 2018/0082102 A1* | 3/2018 | Lee | G06F 21/32 |

(Continued)

FOREIGN PATENT DOCUMENTS

CN 108829181 A 11/2018
KR 10-2014-0019731 A 2/2014

(Continued)

OTHER PUBLICATIONS

International Search Report dated Aug. 10, 2022.

*Primary Examiner* — Christopher R Lamb
(74) *Attorney, Agent, or Firm* — Cha & Reiter, LLC

(57) ABSTRACT

According to certain embodiments of the disclosure, an electronic device comprising: a support member having a first hole; a first fingerprint sensor disposed in the first hole; and a non-conductive injection molding material integrally joining the support member and the first fingerprint sensor.

17 Claims, 17 Drawing Sheets

(56) References Cited

U.S. PATENT DOCUMENTS

2018/0299929 A1* 10/2018 Kim .................. G06F 1/1635
2020/0218920 A1*  7/2020 Guo ................ G06V 40/1318
2020/0344747 A1  10/2020 Park
2021/0132728 A1   5/2021 Hwang et al.

FOREIGN PATENT DOCUMENTS

| KR | 10-2014-0064588 A | 5/2014 |
| KR | 10-2018-0010648 A | 1/2018 |
| KR | 10-2086717 B1 | 3/2020 |
| KR | 10-2020-0040742 A | 4/2020 |
| KR | 10-2021-0054875 A | 5/2021 |
| KR | 10-2021-0138427 A | 11/2021 |
| WO | 2019/160322 A1 | 8/2019 |

* cited by examiner

ELECTRONIC DEVICE INCLUDING FINGERPRINT SENSOR

CROSS-REFERENCE TO RELATED APPLICATION(S)

This application is a continuation of International Application No. PCT/KR2022/006934 filed on May 13, 2022, which claims priority to Korean Patent Application No. 10-2021-0091720 filed in the Korean Intellectual Property Office on Jul. 13, 2021, which is incorporated herein by reference.

BACKGROUND

Technical Field

Certain embodiments of the disclosure relate to an electronic device including a fingerprint sensor.

Description of Related Art

The use of electronic devices such as portable devices of bar type, foldable type, rollable type, or sliding type is increasing, and a variety of functions is provided to such electronic devices.

Security functions can protect the user's personal information. Authenticating the user's biometric information can be used as a security function.

Detect user's fingerprint information by using a fingerprint sensor can be used to authenticate the user's biometric information.

Disposing the fingerprint sensor on a support member (e.g., a bracket) and/or a side member (e.g., a housing) can be used to recognize and detect a user's fingerprint.

Disposing the fingerprint sensor (e.g., an optical fingerprint sensor, a capacitive fingerprint sensor) is disposed on the support member and/or side member of the electronic device, the fingerprint sensor may be joined to the support member and/or the side member through a screw and/or an adhesive.

In case of joining the fingerprint sensor to the support member and/or the side member through the screw and/or the adhesive, a process of disposing the fingerprint sensor in the electronic device is complicated, a joined thickness is increased, and an adhesive strength may be weakened.

Certain embodiments of the disclosure may provide an electronic device capable of integrally joining a fingerprint sensor to a support member and/or a side member through a non-conductive injection molding material.

The technical problems to be achieved in the disclosure are not limited to the above-mentioned problems, and other technical problems not mentioned are clearly understood from the following description by a person skilled in the art to which the disclosure belongs.

SUMMARY

According to certain embodiments of the disclosure, an electronic device comprising: a support member having a first hole; a first fingerprint sensor disposed in the first hole; and a non-conductive injection molding material integrally joining the support member and the first fingerprint sensor.

According to certain embodiments, a method comprises: disposing a fingerprint sensor on one surface of a first mold; and disposing a support member inside a second mold, the support member having a first hole formed therein, closing the first mold and the second mold, inserting non-conductive injection molding material in the first mold and the second mold, between the fingerprint sensor and the support member.

BRIEF DESCRIPTION OF THE DRAWINGS

In connection with the description of the drawings, the same or similar reference numerals may be used for the same or similar components.

DETAILED DESCRIPTION

According to certain embodiments of the disclosure, by integrally joining the fingerprint sensor to the support member (e.g., bracket) and/or the side member (e.g., housing) using the non-conductive injection molding material through the insert injection molding, it is possible to reduce the process and cost for joining the fingerprint sensor to the electronic device.

In addition, various effects explicitly or implicitly appreciated through the disclosure may be provided.

Figure 1:
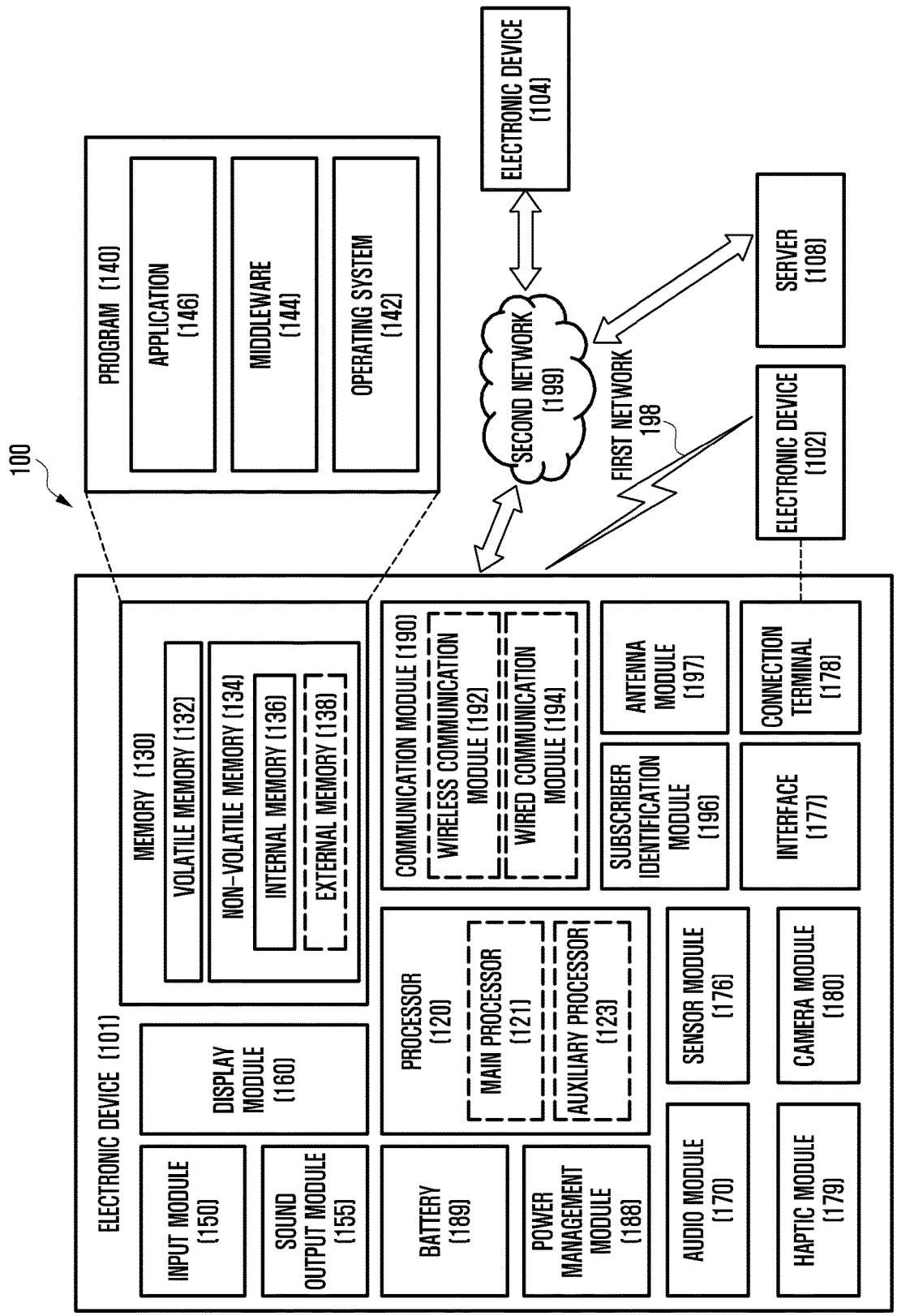
FIG. 1 is a block diagram illustrating an electronic device in a network environment according to certain embodiments of the disclosure.
Figure 2A:
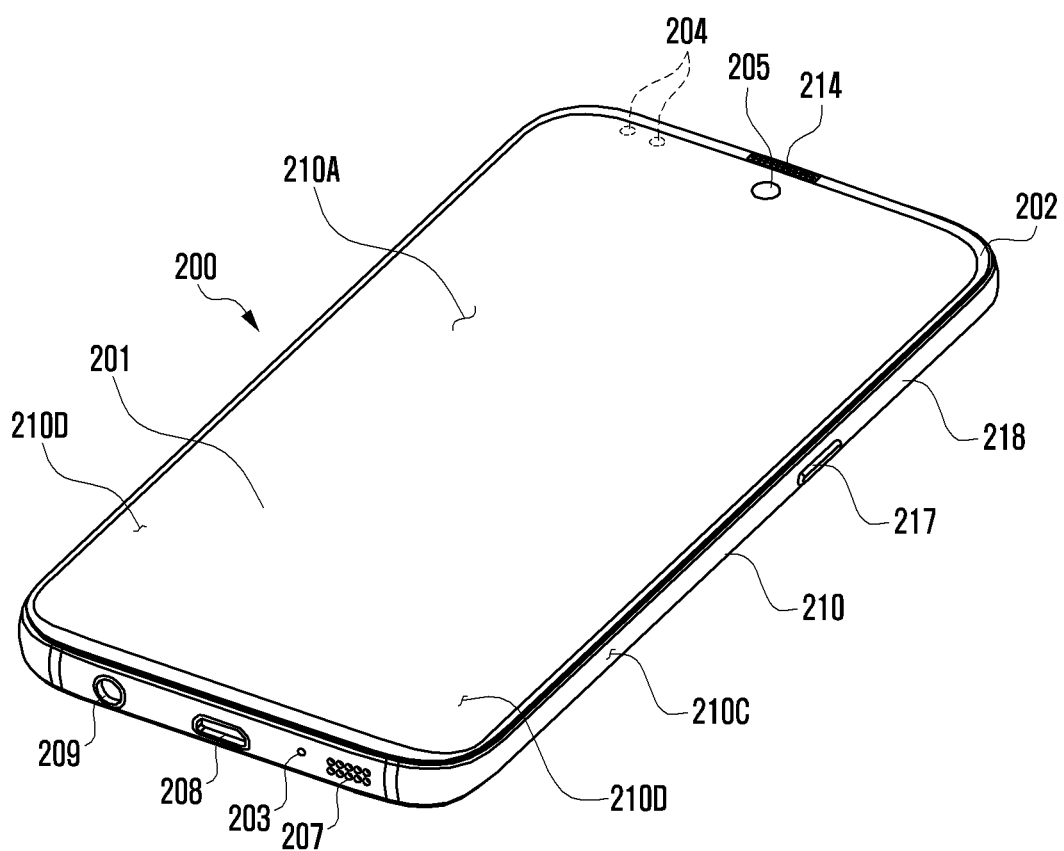
FIG. 2A is a front perspective view illustrating an electronic device according to certain embodiments of the disclosure.
Figure 2B:
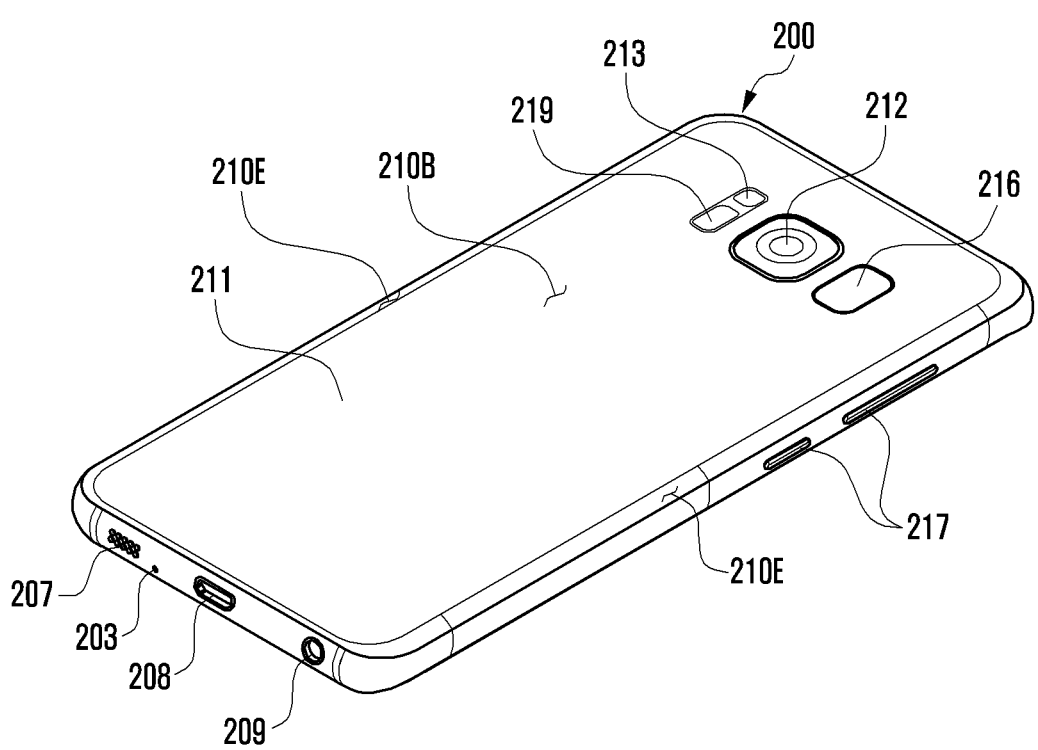
FIG. 2B is a rear perspective view illustrating an electronic device according to certain embodiments of the disclosure.
Figure 3:
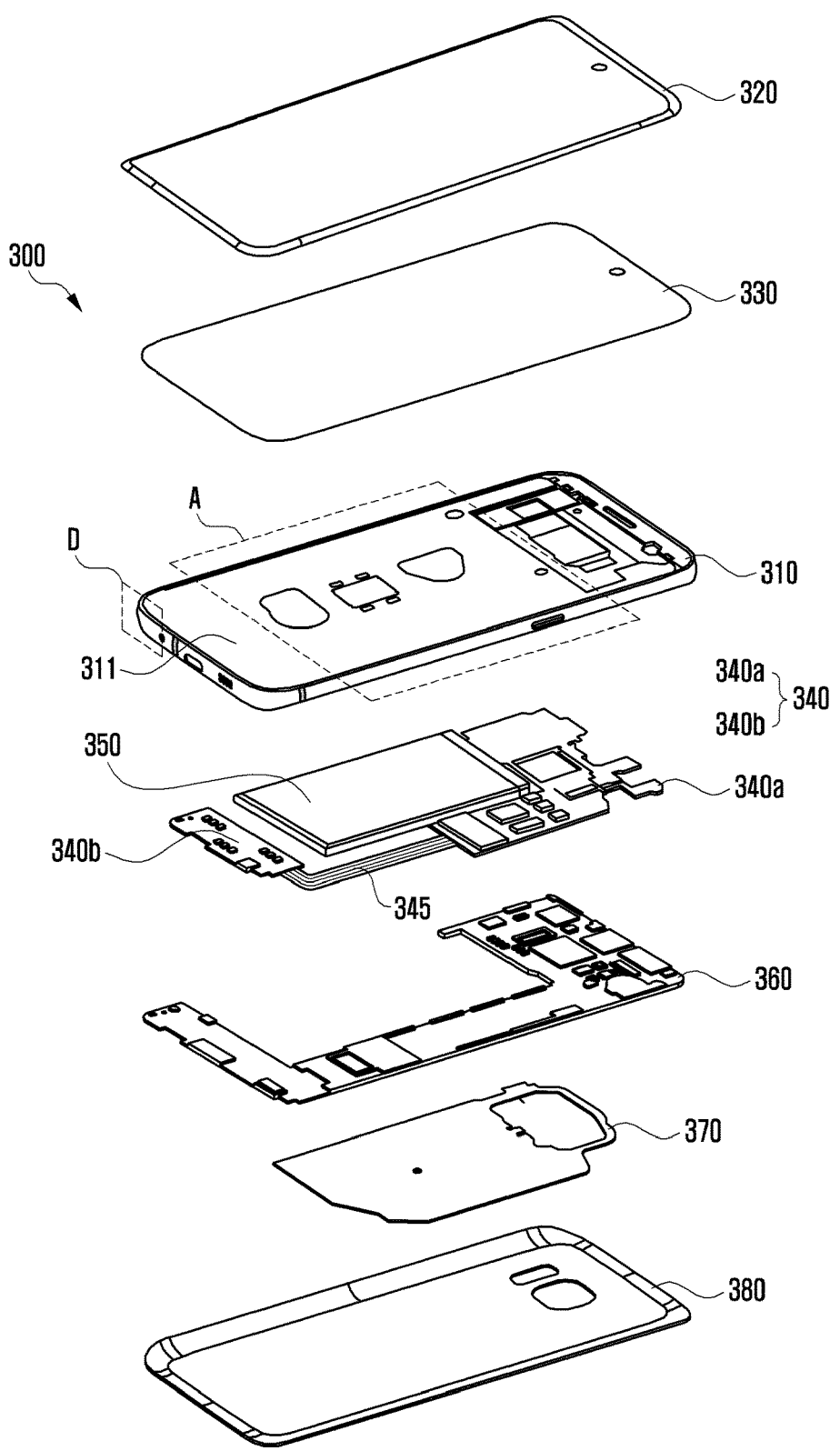
FIG. 3 is an exploded perspective view illustrating an electronic device according to certain embodiments of the disclosure.

This disclosure will begin by describing one embodiment of an electronic device in FIG. 1. FIGS. 2A and 2B will describe the housing of the electronic device from the front perspective (FIG. 2A) and the rear perspective (FIG. 2B). FIG. 3 will describe the interior of the housing.

Electronic Device

FIG. 1 is a block diagram illustrating an electronic device 101 in a network environment 100 according to certain embodiments.

Referring to F. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with certain embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Housing

FIG. 2A is a front perspective view of an electronic device according to certain embodiments of the disclosure. FIG. 2B is a rear perspective view of the electronic device in FIG. 2A according to certain embodiments of the disclosure.

Referring to FIG. 2A and FIG. 2B, an electronic device 200 according to an embodiment may include a housing 210 including a first surface (or front surface) 210A, a second surface (or rear surface) 210B, and a side surface 210C surrounding the space between the first surface 210A and the second surface 210B. In another embodiment (not illustrated), the housing may denote a structure that forms a part of the first surface 210A, the second surface 210B, and the side surface 210C illustrated in FIG. 2A and FIG. 2B. According to an embodiment, the first surface 210A may be formed by a front plate 202, at least a part of which is substantially transparent (for example, a glass plate including various coating layers, or a polymer plate). The second surface 210B may be for med by a rear plate 211 that is substantially opaque. The rear plate 211 may be made of coated or colored glass, ceramic, polymer, metal (for example, aluminum, stainless steel (STS), or magnesium), or a combination of at least two of the above-mentioned materials. The side surface 210C may be formed by a side bezel structure (or "side member") 218 which is coupled to the front plate 202 and to the rear plate 211, and which includes metal and/or polymer. In some embodiments, the rear plate 211 and the side bezel structure 218 may be formed integrally and may include the same material (for example, a metal material such as aluminum).

In the illustrated embodiment, the front plate 202 may include two first areas 210D on both ends of the long edge of the front plate 202 such that the two first areas 210D bend from the first surface 210A toward the rear plate 211 and extend seamlessly. In the illustrated embodiment (see FIG. 2B), the rear plate 211 may include two second areas 210E on both ends of the long edge such that the two second areas 210E bend from the second surface 210B toward the front plate 202 and extend seamlessly. In some embodiments, the front plate 202 (or the rear plate 211) may include only one of the first areas 210D (or the second areas 210E). In another embodiment, a part of the first areas 210D or the second areas 210E may not be included. In the above embodiments, when seen from the side surface of the electronic device 200, the side bezel structure 218 may have a first thickness (or width) on a part of the side surface, which does not include the first areas 210D or the second areas 210E as described above, and may have a second thickness that is smaller than the first thickness on a part of the side surface, which includes the first areas 210D or the second areas 210E.

According to an embodiment, the electronic device 200 may include at least one of a display 201, audio modules 203, 207, and 214, sensor modules 204, 216, and 219, camera modules 205, 212, and 313, a key input device 217, a light-emitting element 206, and connector holes 208 and 209. In some embodiments, at least one of the constituent elements (for example, the key input device 217 or the light-emitting element 206) of the electronic device 200 may be omitted, or the electronic device 200 may additionally include another constituent element.

The display 201 may be exposed through a corresponding part of the front plate 202, for example. In some embodiments, at least a part of the display 201 may be exposed through the front plate 202 that forms the first areas 210D of the side surface 210C and the first surface 210A. In some embodiments, the display 201 may have a corner formed in substantially the same shape as that of the adjacent outer periphery of the front plate 202. In another embodiment (not illustrated), in order to increase the area of exposure of the display 201, the interval between the outer periphery of the display 201 and the outer periphery of the front plate 202 may be formed to be substantially identical.

The audio modules 203, 207, and 214 may include a microphone hole 203 and speaker holes 207 and 214. A microphone for acquiring an external sound may be arranged in the microphone hole 203, and a plurality of microphones may be arranged therein such that the direction of a sound can be sensed in some embodiments. The speaker holes 207 and 214 may include an outer speaker hole 207 and a speech receiver hole 214. In some embodiments, the speaker holes 207 and 214 and the microphone hole 203 may be implemented as a single hole, or a speaker may be included (for example, a piezoelectric speaker) without the speaker holes 207 and 214.

The sensor modules 204, 216, and 219 may generate an electric signal or a data value corresponding to the internal operating condition of the electronic device 200 or the external environment condition thereof. The sensor modules 204, 216, and 219 may include, for example, a first sensor module 204 (for example, a proximity sensor) arranged on the first surface 210A of the housing 210, and/or a second sensor module (not illustrated) (for example, a fingerprint sensor), and/or a third sensor module 219 (for example, an HRM sensor) arranged on the second surface 210B of the housing 210, and/or a fourth sensor module 216 (for example, a fingerprint sensor). The fingerprint sensor may be arranged not only on the first surface 210A (for example, the display 201) of the housing 210, but also on the second surface 210B thereof. The electronic device 200 may further include a sensor module not illustrated, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a luminance sensor 204.

The camera modules 205, 212, and 213 may include a first camera device 205 arranged on the first surface 210A of the electronic device 200, a second camera device 212 arranged on the second surface 210B thereof, and/or a flash 213. The camera devices 205 and 212 may include a single lens or a plurality of lenses, an image sensor, and/or an image signal processor. The flash 213 may include, for example, a light-emitting diode or a xenon lamp. In some embodiments, two or more lenses (an infrared camera, a wide-angle lens, and a telephoto lens) and image sensors may be arranged on a single surface of the electronic device 200.

The key input device 217 may be arranged on the side surface 210C of the housing 210. In another embodiment, the electronic device 200 may not include a part of the above-mentioned key input device 217 or the entire key input device 217, and the key input device 217 (not included) may be implemented in another type, such as a soft key, on the display 201. In some embodiments, the key input device may include a sensor module 216 arranged on the second surface 210B of the housing 210.

The connector holes 208 and 209 may include a first connector hole 208 capable of containing a connector (for example, a USB connector) for transmitting/receiving power and/or data to/from an external electronic device, and/or a second connector hole (for example, an earphone jack) 209 capable of containing a connector for transmitting/receiving an audio signal to/from the external electronic device.

FIG. 3 is an exploded perspective view of the electronic device according to certain embodiments of the disclosure.

Referring to FIG. 3, the electronic device 300 may include a side bezel structure 310, a first support member 311 (for example, a bracket), a front plate 320, a display 330, a printed circuit board 340, a battery 350, a second support member 360 (for example, a rear case), an antenna 370, and a rear plate 380. In some embodiments, at least one of the constituent elements (for example, the first support member 311 or the second support member 360) of the electronic device 300 may be omitted, or the electronic device 300 may further include another constituent element. At least one of the constituent elements of the electronic device 300 may be identical or similar to at least one of the constituent elements of the electronic device 101 or 200 of FIG. 1 to FIG. 2B, and repeated descriptions thereof will be omitted herein.

The first support member 311 may be arranged inside the electronic device 300 and connected to the side bezel structure 310, or may be formed integrally with the side bezel structure 310. The first support member 311 may be made of a metal material and/or a nonmetal (for example, polymer) material, for example. The display 330 may be coupled to one surface of the first support member 311, and the printed circuit board 340 may be coupled to the other surface thereof. A processor, a memory, and/or an interface may be mounted on the printed circuit board 340. The processor may include, for example, one or more of a central processing device, an application processor, a graphic processing device, an image signal processor, a sensor hub processor, or a communication processor.

According to certain embodiments, the printed circuit board (PCB) 340 may include a first PCB 340a and/or a second PCB 340b. For example, the first PCB 340a and the second PCB 340b may be disposed to be spaced apart from each other, and may be electrically connected using a connection member 345 (e.g., a coaxial cable and/or a FPCB). In another example, the PCB 340 may include a structure in which a plurality of PCBs are stacked. The PCB 340 may include an interposer structure. The PCB 340 may be implemented in the form of a flexible printed circuit board (FPCB) and/or a rigid printed circuit board (PCB).

The memory may include a volatile memory or a nonvolatile memory, for example.

The interface may include, for example, a high definition multimedia interface (HDMI), a universal serial bus (USB) interface, an SD card interface, and/or an audio interface. The interface may connect the electronic device 300 with an external electronic device electrically or physically, for example, and may include a USB connector, an SD card/MMC connector, or an audio connector.

The battery 350 is a device for supplying power to at least one constituent element of the electronic device 300, and may include a non-rechargeable primary cell, a rechargeable secondary cell, or a fuel cell, for example. At least a part of the battery 350 may be arranged on substantially the same plane with the printed circuit board 340, for example. The battery 350 may be arranged integrally inside the electronic device 300, or may be arranged such that the same can be attached to/detached from the electronic device 300.

The antenna 370 may be arranged between the rear plate 380 and the battery 350. The antenna 370 may include, for example, a near field communication (NFC) antenna, a wireless charging antenna, and/or a magnetic secure transmission (MST) antenna. The antenna 370 may conduct near-field communication with an external device or may wirelessly transmit/receive power necessary for charging, for example. In another embodiment, an antenna structure may be formed by a part or a combination of the side bezel structure 310 and/or the first support member 311.

Figure 4:
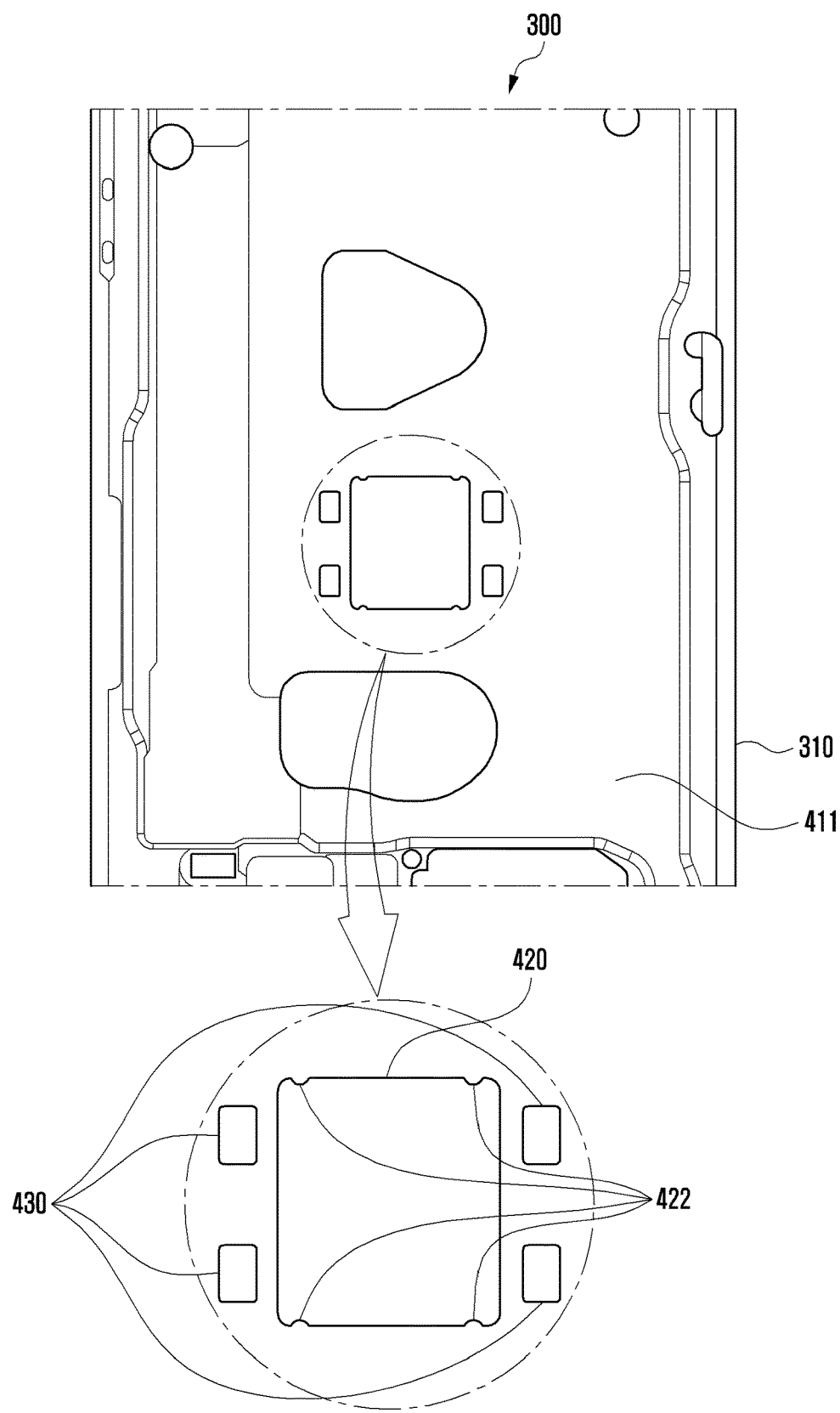
FIG. 4 is an enlarged view schematically illustrating a region A of the electronic device according to certain embodiments of the disclosure shown in FIG. 3.
Figure 5:
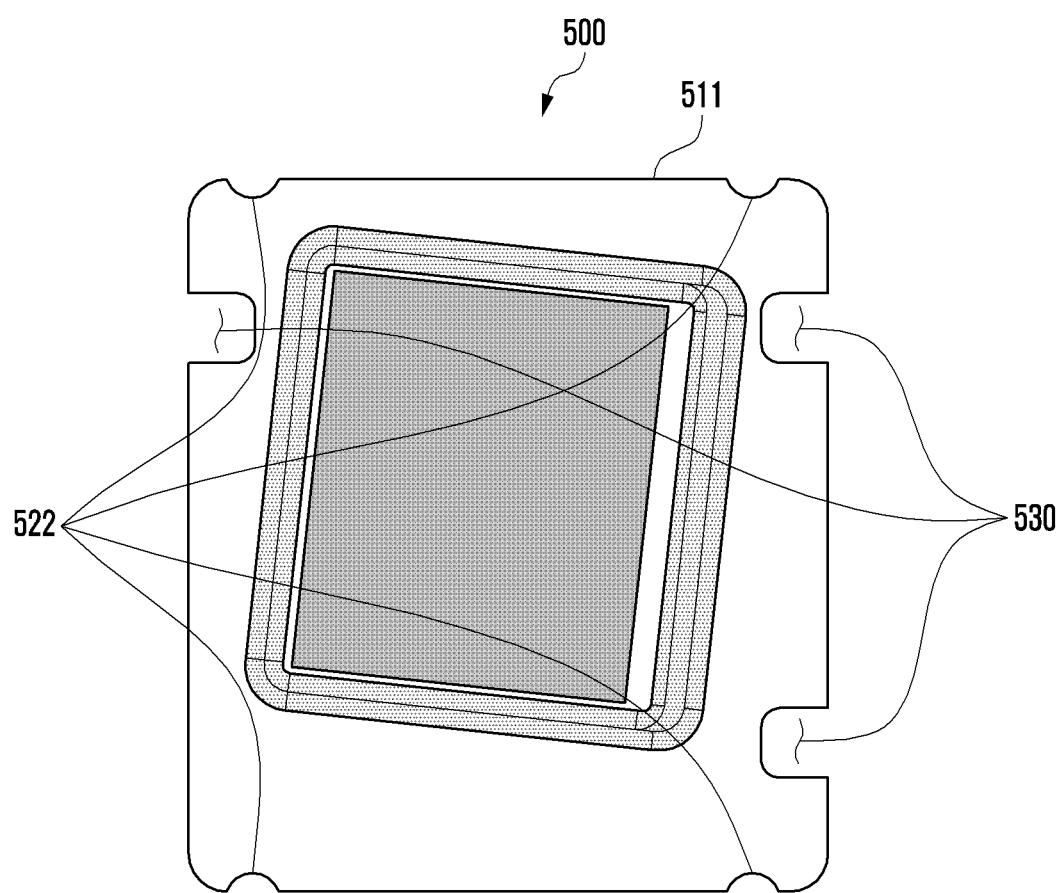
FIG. 5 is a diagram schematically illustrating a fingerprint sensor according to certain embodiments of the disclosure.

FIG. 4 is an enlarged view schematically illustrating a region A of the electronic device according to certain embodiments of the disclosure shown in FIG. 3. FIG. 5 is a diagram schematically illustrating a fingerprint sensor according to certain embodiments of the disclosure.

An electronic device, such as electronic device 300 of FIG. 4 may include embodiments described in the electronic device 101 of FIG. 1, the electronic device 200 of FIGS. 2A and 2B, and/or the electronic device 300 of FIG. 3. In the description of FIG. 4, the same reference numerals are assigned to components substantially the same as those of the embodiment of the electronic device 300 illustrated in FIG. 3, and duplicate descriptions may be omitted.

Although the embodiment related to the electronic device 300 of FIG. 4 will be described with respect to a bar-type electronic device, it shall be understood that this disclosure is not limited to bar-type electronic devices and can include, but is not limited to, foldable type, a rollable type, a sliding type, a wearable type, tablet PC, or notebook PC.

With reference to FIG. 4, the electronic device 300 may include a side member 310 (e.g., a housing) forming at least a portion of an exterior, and a support member 411 (e.g., the first support member 311 in FIG. 3) disposed inside or surrounded by a closed loop formed by the side member 310. The support member 411 may be integrally formed with the side member 310. The side member 310 may be a portion of a housing of the electronic device 300.

A display (e.g., the display 330 in FIG. 3) may be located on one surface (e.g., an upper surface) of the support member 311, and a printed circuit board (e.g., the printed circuit board 340 in FIG. 3) may be located on the other surface (e.g., a lower surface).

The support member 411 may have a first hole 420 to accommodate therein, a fingerprint sensor 500 shown in FIG. 5.

The fingerprint sensor 500 disposed in the support member 411 may be a first fingerprint sensor. In an embodiment, the fingerprint sensor 500 (e.g., the first fingerprint sensor) may include an optical fingerprint sensor or a lens-type fingerprint sensor.

The support member 411 may have at least one protrusion 422 protruding toward the inside of the first hole 420. The at least one protrusion 422 may be configured to improve a joining force with the fingerprint sensor 500.

The support member 411 may have at least one second hole 430 spaced apart (e.g., left and/or right) from the first hole 420. The at least one second hole 430 may be filled with a non-conductive injection molding material (e.g., the non-conductive injection molding material 601 in FIG. 6 or 7).

The fingerprint sensor 500 may be disposed in the first hole 420. The fingerprint sensor 500 may have at least one notch 522 positioned to correspond to the at least one protrusion 422 of the first hole 420.

The non-conductive injection molding material (e.g., the non-conductive injection molding material 601 in FIG. 6 or 7) may be filled between the at least one protrusion 422 and the at least one notch 522.

Figure 6:
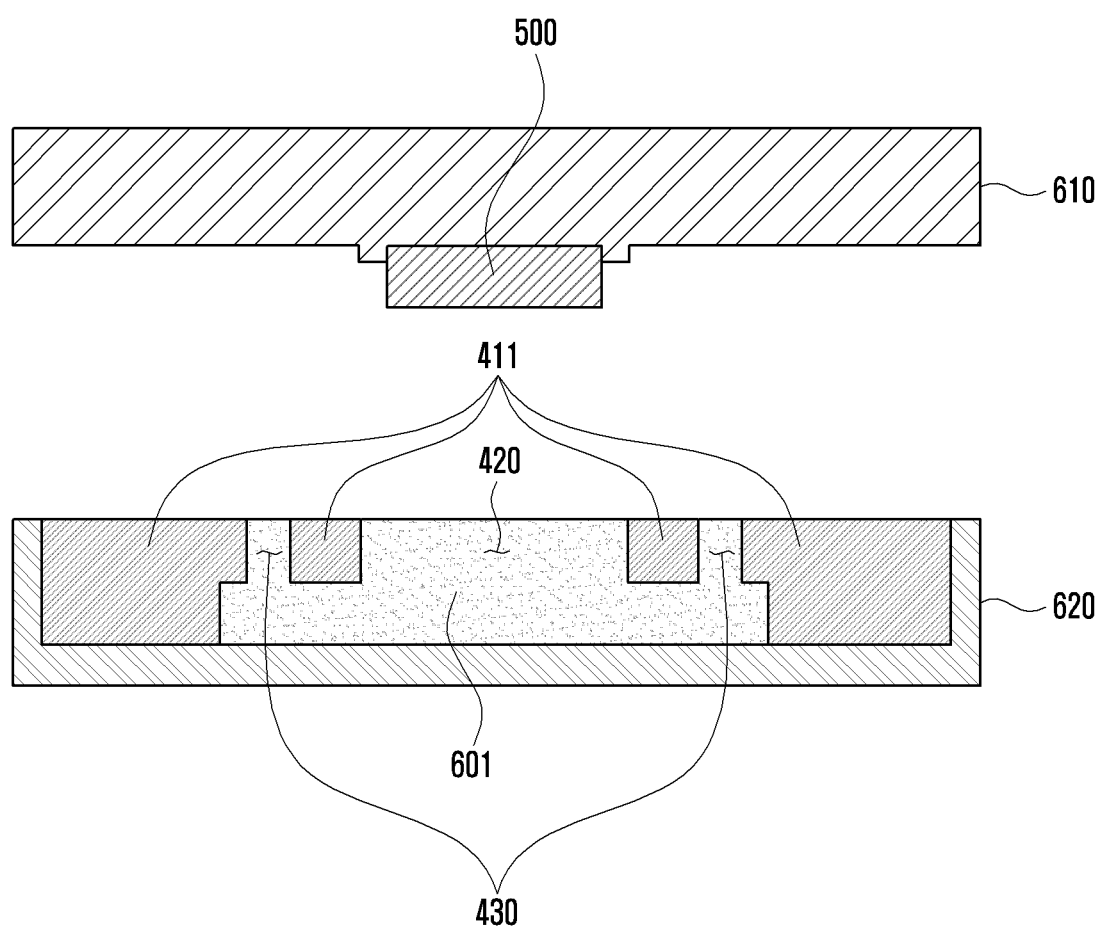
FIG. 6 is a diagram illustrating a process of integrally joining a fingerprint sensor and a support member through an insert injection molding according to certain embodiments of the disclosure.
Figure 7:
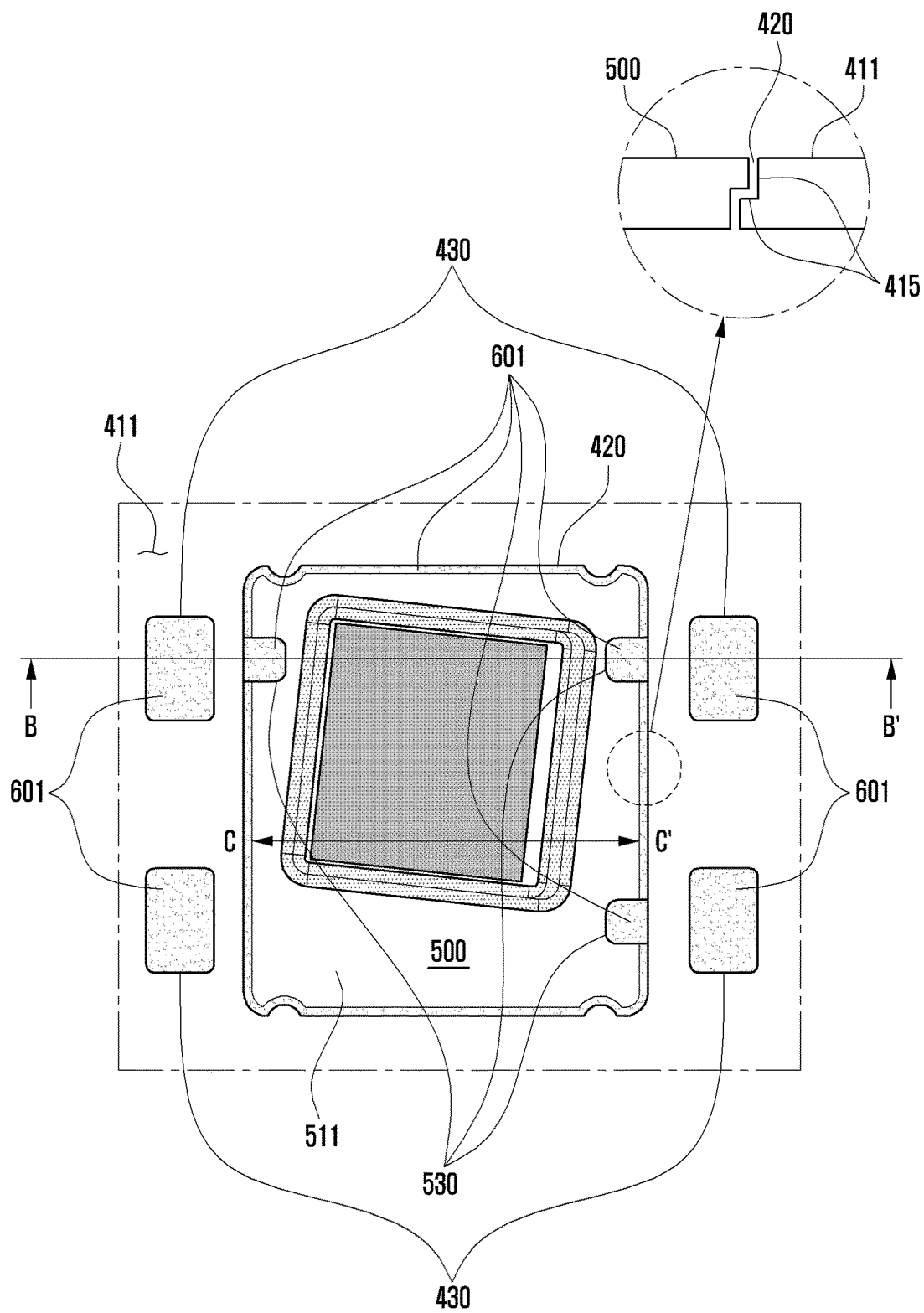
FIG. 7 is a diagram illustrating a state in which a fingerprint sensor and a support member are joined together using a non-conductive injection molding material through an insert injection molding according to certain embodiments of the disclosure.

A support plate 511 of the fingerprint sensor 500 may include, at least in part, at least one groove 530 filled with the non-conductive injection molding material (e.g., the non-conductive injection molding material 601 in FIG. 6 or 7).

FIG. 6 is a diagram illustrating a process of integrally joining a fingerprint sensor and a support member through an insert injection molding according to certain embodiments of the disclosure.

The fingerprint sensor 500 of the electronic device 300 according to certain embodiments of the disclosure may be integrally joined to the support member 411 through the non-conductive injection molding material 601.

The non-conductive injection molding material 601 may be injected between the support member 411 and the fingerprint sensor 500 through the insert injection molding using a first mold 610 and a second mold 620. It shall be understood that injection molded material is material that is formed from a substance that is capable of being initially in a liquid, slushy state, which hardens and has a structure that reliably inverted from a mold.

It shall be understood that the term "molded" not only refers to a process, but that the resultant product of molding results in a structure that completely fills the mold, thereby resulting in an almost in an almost exact inverse of the mold. Moreover, when injection molding material is molded around another object, the result is that the object is embedded in the molding material, wherein the molding material makes contact with each and surface area of the object.

The fingerprint sensor 500 may be disposed at a position on a first surface (e.g., a lower surface) of the first mold 610.

The position at which the fingerprint sensor 500 is disposed on the first surface of the first mold 610 may be accommodated by protrusion on the first surface that can receive and hold the fingerprint sensor 500.

A support member 411 having the first hole 420 and/or the at least one second hole 430 may be disposed in the second mold 620.

The second mold 620 can be formed to receive the support member 411, such that the edges of the support member 411 abut lateral edges of the second mold 620, and the bottom of the support member 411 is supported by a bottom of the second mold 620.

The position of the fingerprint sensor 500 on the first surface (e.g., the lower surface) of the first mold 610, corresponding to the position of the support member 411 inside the second mold 620, allow the fingerprint sensor 500 to be accurately joined at the location of the first hole 420 formed in the support member 411. When the fingerprint sensor 500 and the support member 411 are accurately joined at the location, performance variations of the fingerprint sensor 500 may be reduced.

The first mold 610 and the second mold 620 may be closed and opened with respect to each other.

When the first and second molds 610 and 620 are in a closed state, the non-conductive injection molding material 601 may be injected between the fingerprint sensor 500 and the first hole 420 and inside the at least one second hole 430.

As the non-conductive injection molding material 601 is injected between the first mold 610 and the second mold 620, the fingerprint sensor 500 and the support member 411 may be integrally joined to each other.

The non-conductive injection molding material 601 may include, but is not limited to, polycarbonate (PC) and/or acrylonitrile-butadiene-styrene (ABS) resin. In another example, the non-conductive injection molding material 601 may include polyimide, plastic, and/or polymer resin.

The non-conductive injection molding material 601 injected between the first mold 610 and the second mold 620 fills the first hole 420 and at least one second hole 430 formed in the support member 411 and is then solidified, thereby integrally joining the fingerprint sensor 500 and the support member 411.

Figure 8:
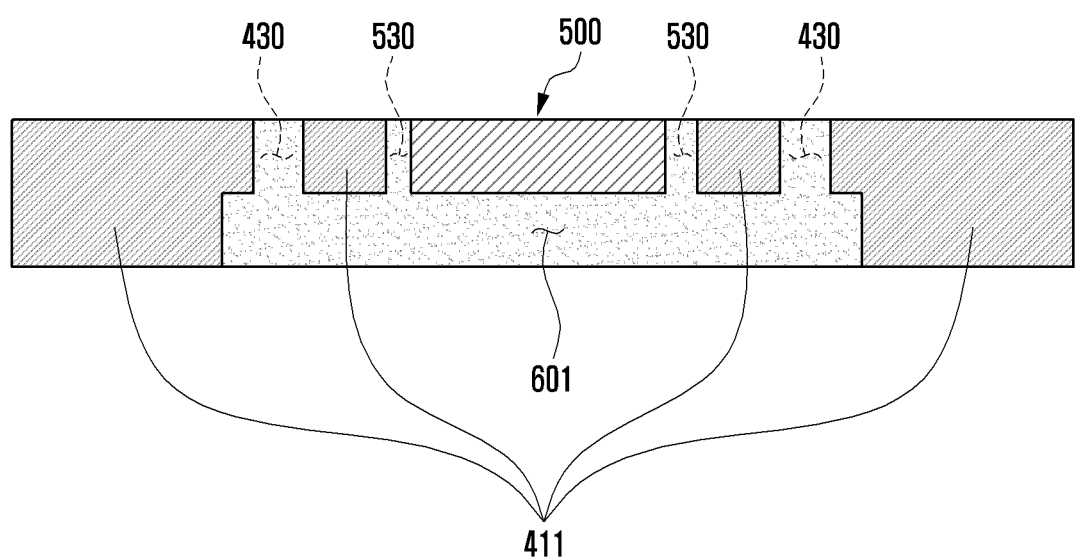
FIG. 8 is a cross-sectional view schematically illustrating a portion B-B' in the joined state of the fingerprint sensor and the support member shown in FIG. 7.

FIG. 7 is a diagram illustrating a state in which a fingerprint sensor and a support member are joined together using a non-conductive injection molding material through an insert injection molding according to certain embodiments of the disclosure. FIG. 8 is a cross-sectional view schematically illustrating a portion B-B' in the joined state of the fingerprint sensor and the support member shown in FIG. 7.

FIG. 7 shows a state in which the fingerprint sensor 500 and the support member 411 are joined using the non-conductive injection molding material 601 through the insert injection molding shown in FIG. 6.

With reference to FIGS. 7 and 8, the fingerprint sensor 500 according to certain embodiments of the disclosure may be disposed inside the first hole 420 formed in the support member 411.

In a state in which the first and second molds 610 and 620 shown in FIG. 6 are closed, the non-conductive injection molding material 601 may be injected.

The non-conductive injection molding material 601 may be filled between the fingerprint sensor 500 and the first hole 420 by adhesion of the non-conductive injection-molding material 601 to the support member 411 and the fingerprint sensor 500. The non-conductive injection molding material 601 may form a thin circumference or permitter surrounding the fingerprint sensor 500 inside the first hole 420. Additionally, the perimeter of the non-conductive injection molding material 601 may form a curve corresponding to the notches 522/protrusions 422. Moreover, the non-conductive injection molding material 601 can seal the space between the fingerprint sensor 500 and the support member 411.

The non-conductive injection molding material 601 may also be filled in the at least one second hole 430 formed in the support member 411.

The non-conductive injection molding material 601 may also be filled in the at least one groove 530 formed in the support plate 511 of the fingerprint sensor 500. The support plate 511 may be disposed on substantially the same plane as the support member 411.

The non-conductive injection molding material 601 is filled between the fingerprint sensor 500 and the support member 411 having the first hole 420 formed therein and in the at least one groove 530, so that the fingerprint sensor 500 and the support member 411 may be joined together by adherence to the non-conductive injection molding material 611. In an embodiment, the at least one second hole 430 may be omitted.

According to certain embodiments, in order to increase the joining force using the non-conductive injection molding material 601 between the fingerprint sensor 500 and the support member 411 having the first hole 420 formed therein, an inner surface of the support member 411 facing the first hole 420 may have a step structure 415 formed at least in part. The step structure 415 may include at least one vertical surface and at least one horizontal surface.

Figure 9:
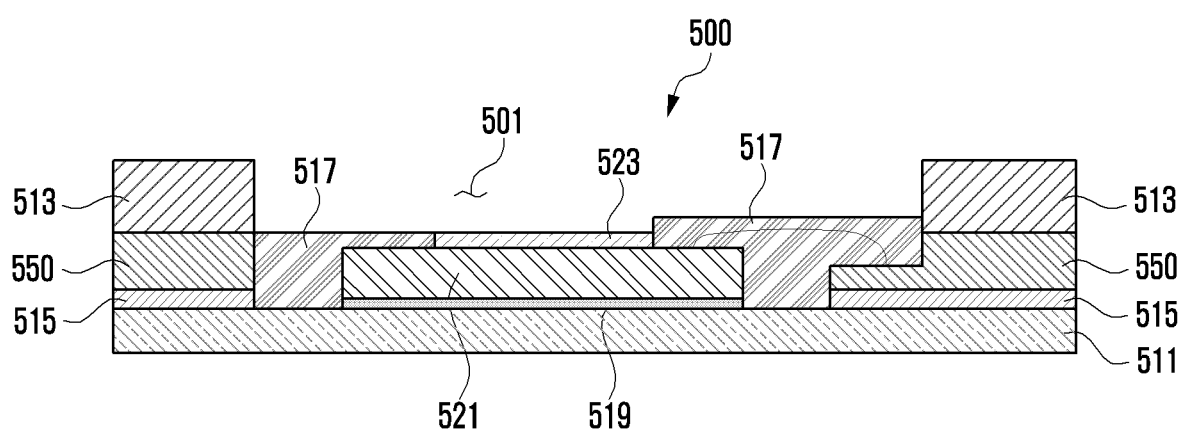
FIG. 9 is a cross-sectional view schematically illustrating a portion C-C' of the fingerprint sensor shown in FIG. 7 according to certain embodiments of the disclosure.

FIG. 9 is a cross-sectional view schematically illustrating a portion C-C' of the fingerprint sensor shown in FIG. 7 according to certain embodiments of the disclosure.

With reference to FIGS. 7 and 9, the fingerprint sensor 500 according to certain embodiments of the disclosure may be disposed inside the first hole 420 formed in the support member 411.

The fingerprint sensor 500 may include the support plate 511, an elastic member 513, an adhesive layer 515, a filling part 517, an adhesive film 519, a base member 521, and/or a sensing pixel 523.

According to certain embodiments, the support plate 511 may be placed inside the first hole 420 formed in the support member 411, and may be disposed on substantially the same plane as one surface of the support member 411. The support plate 511 may include, for example, stainless use steel (SUS).

The elastic member 513 may be disposed with a gap 501 formed under the display (e.g., the display 330 in FIG. 3) interposed therebetween. The elastic member 513 may prevent a sensor mounting module 550 (e.g., FPCB) from coming into contact with the display (e.g., the display 330 in FIG. 3). The elastic member 513 may include a cushion layer having elasticity.

The adhesive layer 515 may be disposed between the elastic member 513 and the support plate 511. The adhesive layer 515 may adhere a portion of the sensor mounting module 550 to at least a portion of the support plate 511.

The filling part 517 may be disposed in an inner space surrounded by the elastic member 513 and the adhesive layer 515. The filling part 517 may include a dielectric material or an insulator. In an embodiment, the filling part 517 may be formed around the sensing pixel 523. For example, one portion and other portion the filling part 517 may be formed in different shapes (e.g., coated regions) based on a structure around the sensing pixel 523. For example, when a wire of the fingerprint sensor 500 is disposed in one portion of the filling part 517, this portion of the filling part 517 in which the wire is disposed may be formed to be wider.

The adhesive film 519 may be disposed between the base member 521 and the support plate 511. The adhesive film 519 may include, for example, a die attach film (DAF). The adhesive film 519 may adhere a portion of the support plate 511 and the base member 521 (e.g., a die).

The base member 521 may be bonded to a portion of the support plate 511 through the adhesive film 519. The base member 521 may support the sensing pixel 523.

The sensing pixel 523 may be disposed on one surface of the base member 521. The sensing pixel 523 may be exposed to the display (e.g., the display 330 in FIG. 3) through the gap 501. The sensing pixel 523 of the fingerprint sensor 500 may recognize and detect a fingerprint from a user's finger in contact with the display (e.g., the display 330 in FIG. 3).

The elastic 513, sensor mounting module 550, and support plate 511 can be made of materials that adhere to the non-conductive injection molding material 611.

Figure 10:
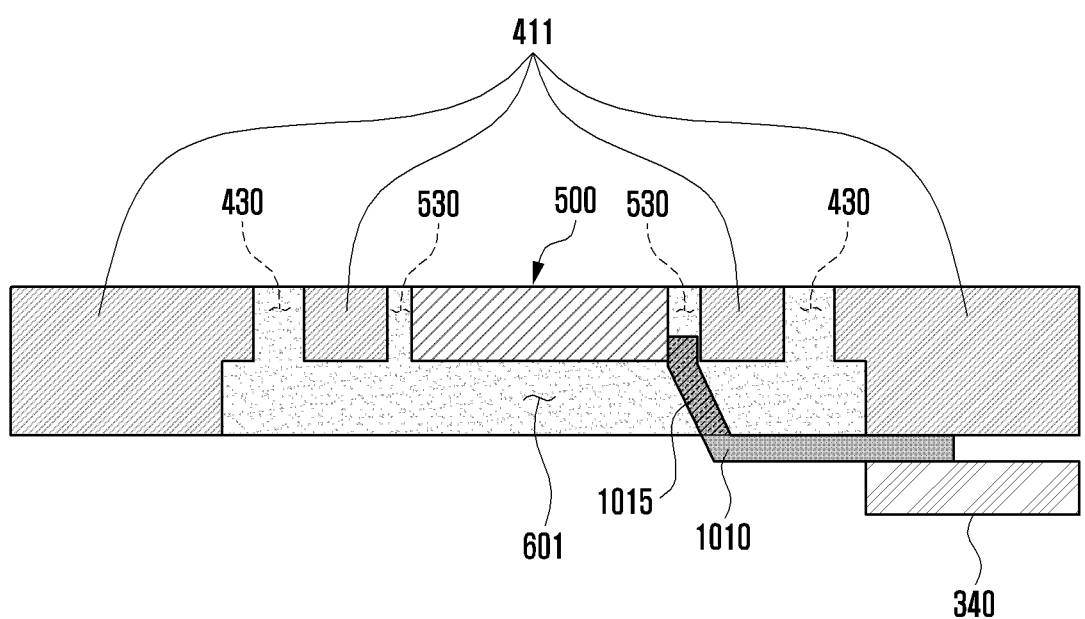
FIG. 10 is a cross-sectional view illustrating a state in which a fingerprint sensor and a printed circuit board are connected using a signal connection member according to certain embodiments of the disclosure.

FIG. 10 is a cross-sectional view illustrating a state in which a fingerprint sensor and a printed circuit board are connected using a signal connection member according to certain embodiments of the disclosure.

The fingerprint sensor 500 can communicate and receive power from the printed circuit board 340 through a signal connection member.

With reference to FIG. 10, in the electronic device 300 according to certain embodiments of the disclosure, the fingerprint sensor 500 may be electrically connected to the printed circuit board 340 using a signal connection member 1010 (e.g., FPCB), and then the insert injection molding may be performed. Accordingly, the non-conductive injection molding material 601 may form around the FPCB 1010, so as to embed or set-in the FPCB 1010.

The signal connection member 1010 may be coated with a heat-resistant film 1015 in a portion contacting the non-conductive injection molding material 601.

The heat-resistant film 1015 may prevent the signal connection member 1010 from being damaged by heat of the non-conductive injection molding material 601 during the insert injection molding. The heat-resistant film 1015 may include, for example, polyimide.

Figure 11:
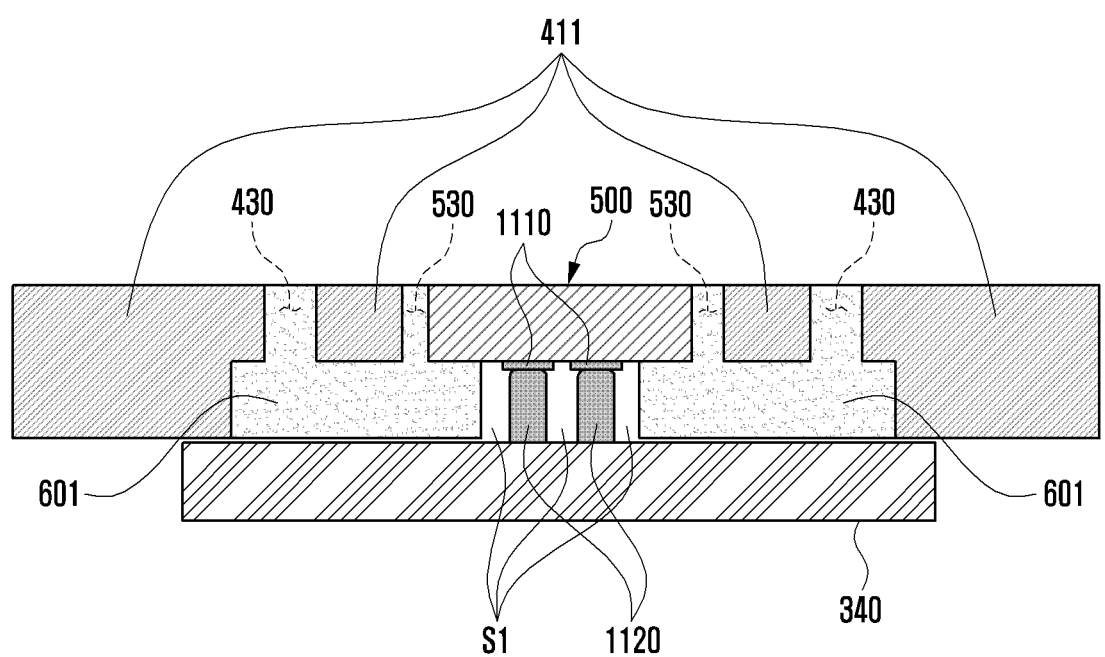
FIG. 11 is a cross-sectional view illustrating a state in which a fingerprint sensor and a printed circuit board are connected using a signal connection pin according to certain embodiments of the disclosure.

FIG. 11 is a cross-sectional view illustrating a state in which a fingerprint sensor and a printed circuit board are connected using a signal connection pin according to certain embodiments of the disclosure.

With reference to FIG. 11, in the electronic device 300 according to certain embodiments of the disclosure, at least one conductive pad 1110 may be formed on one surface of the fingerprint sensor 500 (e.g., a surface of the fingerprint sensor 500 facing the printed circuit board 340).

The non-conductive injection molding material 601 may be filled in a portion except for a space S1 in which the at least one conductive pad 1110 is formed. For example, mold 620 may be shaped with a block at the base that corresponds to the space S1.

According to an embodiment, the at least one conductive pad 1110 may be electrically connected to the printed circuit board 340 using at least one signal connection pin 1120 (e.g., a pogo pin or a C-clip).

Figure 12:
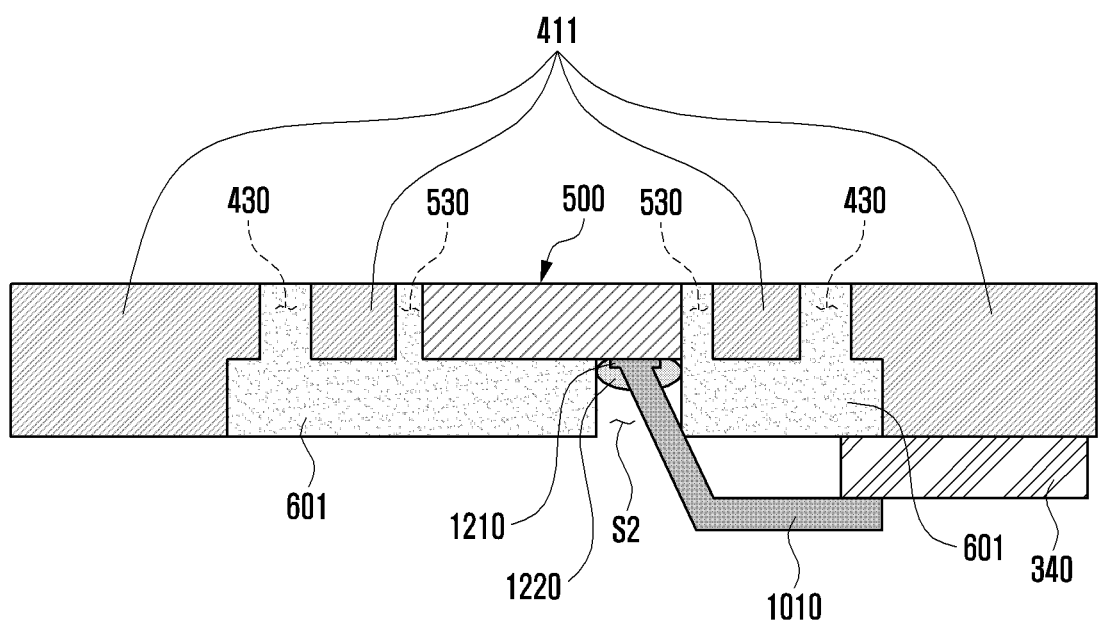
FIG. 12 is a cross-sectional view illustrating a state in which a fingerprint sensor and a printed circuit board are connected using a signal connection member according to certain embodiments of the disclosure.

FIG. 12 is a cross-sectional view illustrating a state in which a fingerprint sensor and a printed circuit board are connected using a signal connection member according to certain embodiments of the disclosure.

With reference to FIG. 12, in the electronic device 300 according to certain embodiments of the disclosure, a conductive pad 1210 may be formed on one surface of the fingerprint sensor 500 (e.g., a surface of the fingerprint sensor 500 facing the printed circuit board 340).

The non-conductive injection molding material 601 may be filled in a portion except for a space S2 in which the conductive pad 1210 is formed.

The conductive pad 1210 may be electrically connected to a first end of the signal connection member 1010 (e.g., FPCB) through a conductive adhesive 1220. A second end of the signal connection member 1010 may be electrically connected to the printed circuit board 340.

When the non-conductive injection molding material 601 is filled in the portion except for the space S2 in which the conductive pad 1210 is formed, the position of the printed circuit board 340 electrically connected to the signal connection member 1010 may be more freely. In certain embodiments, mold 620 may include a block corresponding to the location of the space S2.

Figure 13:
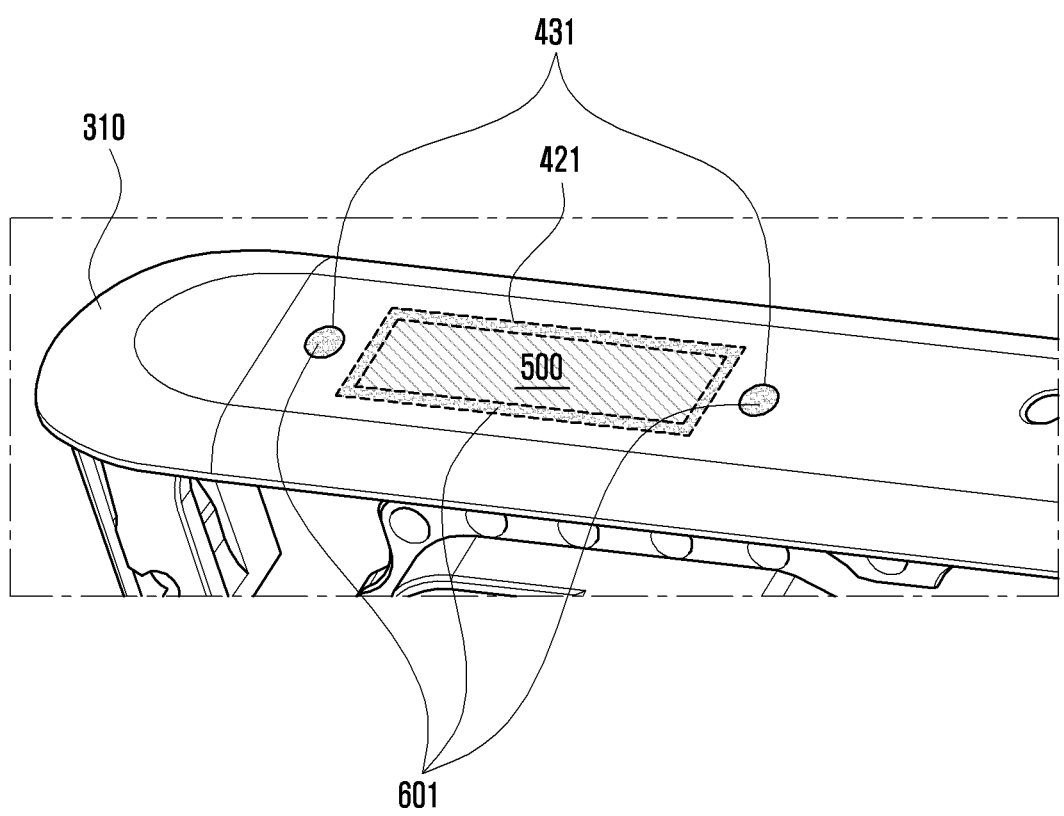
FIG. 13 is a diagram illustrating a state in which a fingerprint sensor is disposed in a side member of an electronic device according to certain embodiments of the disclosure.

FIG. 13 is a diagram illustrating a state in which a fingerprint sensor is disposed in a side member of an electronic device according to certain embodiments of the disclosure.

For example, FIG. 13 may be an enlarged view schematically illustrating a region D of the electronic device shown in FIG. 3.

With reference to FIG. 13, the fingerprint sensor 500 according to certain embodiments of the disclosure may be disposed in the side member 310. The fingerprint sensor 500 disposed in the side member 310 may be a second fingerprint sensor. According to an embodiment, the fingerprint sensor 500 (e.g., the second fingerprint sensor) may be integrally joined to the side member 310 through the non-conductive injection molding material 601. In an embodiment, the fingerprint sensor 500 may include a capacitive fingerprint sensor.

The side member 310 may include a third hole 421 for disposing the fingerprint sensor 500.

The side member 310 may have at least one fourth hole 431 formed to be spaced apart (e.g., left and/or right) from the third hole 421.

The non-conductive injection molding material 601 may be filled between the fingerprint sensor 500 and the side member 310 having the third hole 421 formed therein. The non-conductive injection molding material 601 may also be filled in the at least one fourth hole 431 formed in the side member 310.

During the insert injection molding, the non-conductive injection molding material 601 may be filled between the fingerprint sensor 500 and the side member 310 having the third hole 421 formed therein and in the at least one fourth hole 431. After the insert injection molding, the side member 310 may be painted or coated using a non-conductive material (e.g., a polymer material).

Figure 14A:
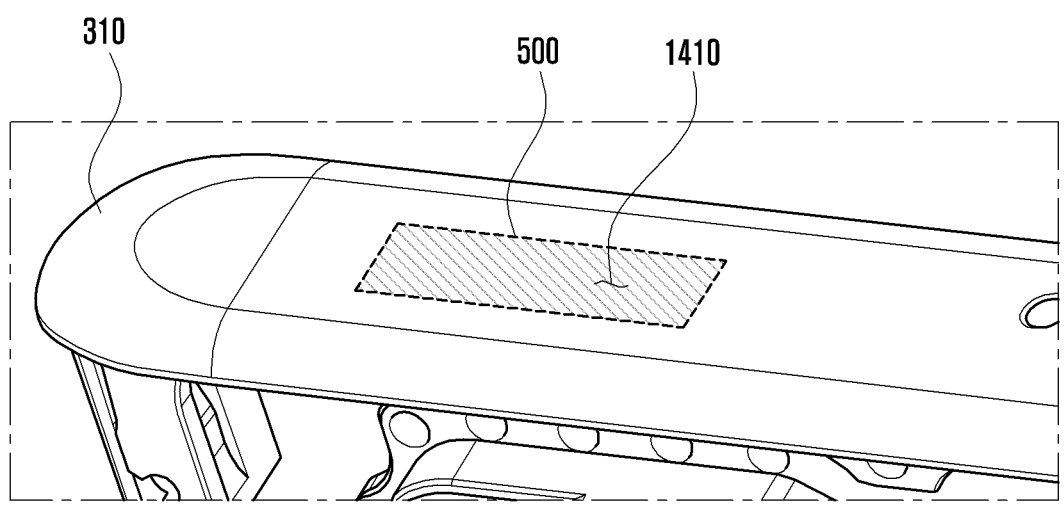
FIGS. 14A to 14C are diagrams illustrating various examples for identifying a fingerprint sensor disposed in a side member according to certain embodiments of the disclosure.
Figure 14B:
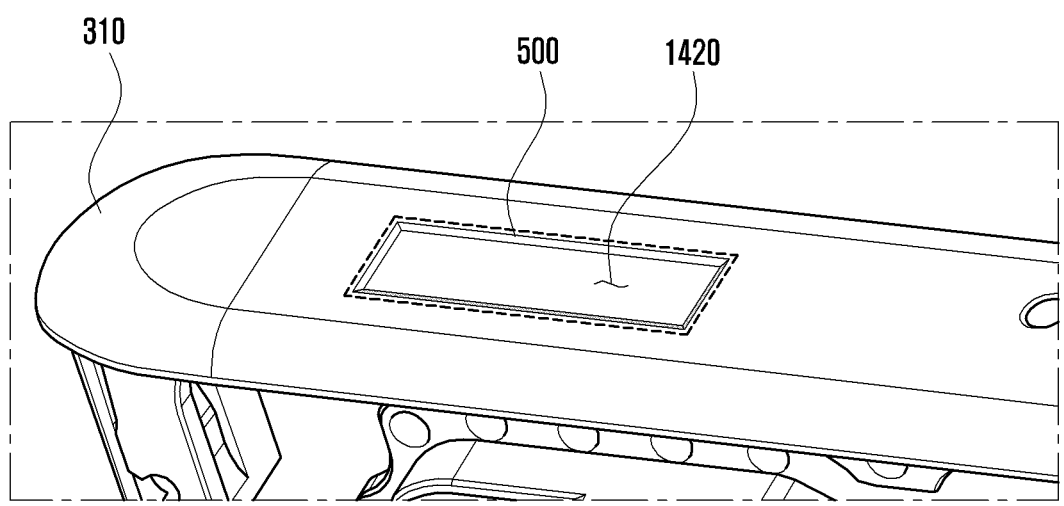
Figure 14C:
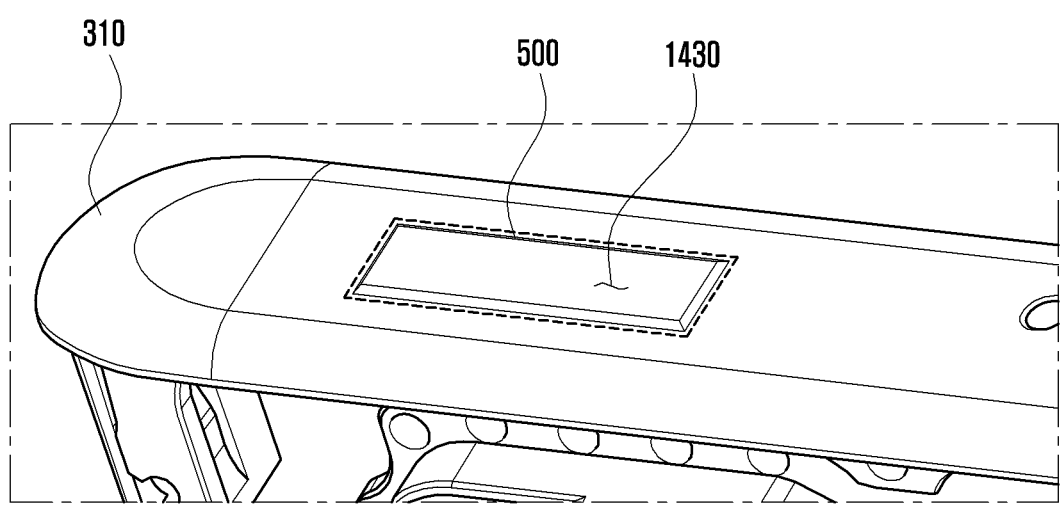

FIGS. 14A to 14C are diagrams illustrating various examples for identifying a fingerprint sensor disposed in a side member according to certain embodiments of the disclosure.

With reference to FIG. 14A, the side member 310 may have at least in part a color region 1410 so that the user can visually identify a region where the fingerprint sensor 500 is disposed. A color of the color region 1410 may be different from a color of the side member 310.

With reference to FIG. 14B, the side member 310 may have at least in part a concave region 1420 so that the user can tactually identify a region where the fingerprint sensor 500 is disposed. The concave region 1420 may be formed in the form of a concave recess in a portion of the side member 310 in which the fingerprint sensor 500 is disposed.

With reference to FIG. 14C, the side member 310 may have at least in part a convex region 1430 so that the user can tactually identify a region where the fingerprint sensor 500 is disposed. The convex region 1430 may be formed in the form of a convex protrusion in a portion of the side member 310 in which the fingerprint sensor 500 is disposed.

According to certain embodiments, the fingerprint sensor 500 (e.g., the second fingerprint sensor) shown in FIGS. 14A to 14C may be electrically connected to the printed circuit board 340 shown in FIG. 3, 10, 11, or 12. Using the signal connection member 1010 shown in FIG. 10 or 12 or the signal connection pin 1120 shown in FIG. 11, the fingerprint sensor 500 may be electrically connected to the printed circuit board 340.

According to certain embodiments of the disclosure, an electronic device 300 may include a support member 411 having a first hole 420, a first fingerprint sensor 500 disposed in the first hole 420, and a non-conductive injection molding material 601 integrally joining the support member 411 and the first fingerprint sensor 500.

According to certain embodiments, the support member 411 may have at least one protrusion 422 protruding toward an inside of the first hole 420, the first fingerprint sensor 500 may have at least one notch 522 formed at a position corresponding to the at least one protrusion 422, and the non-conductive injection molding material 601 may be filled between the at least one protrusion 422 and the at least one notch 522.

According to certain embodiments, the first fingerprint sensor 500 may have at least one groove 530 filled with the non-conductive injection molding material 601.

According to certain embodiments, the first fingerprint sensor 500 may include an optical fingerprint sensor or a lens-type fingerprint sensor.

According to certain embodiments, the support member 411 may have at least one second hole 430 formed to be spaced apart from the first hole 420, and the at least one second hole 430 may be filled with the non-conductive injection molding material 601.

According to certain embodiments, the non-conductive injection molding material 601 fills a space between the support member 411 and the first fingerprint sensor 500, wherein the support member 411 adheres to the non-conductive injection molding material 601.

According to certain embodiments, the electronic device may further include a printed circuit board 340 disposed on one surface of the support member 411, and wherein the first fingerprint sensor 500 is connected to the printed circuit board 340 through a signal connection member 1010, and the non-conductive molding material is molded around the printed circuit board.

According to certain embodiments, further comprising heat-resistant film coating the signal connection member 1010 in a portion of the signal connecting member contacting the non-conductive injection molding material 601.

According to certain embodiments, the electronic device may further include a printed circuit board 340 disposed on one surface of the support member 411, at least one conductive pad 1110 formed on one surface of the first fingerprint sensor 500, the non-conductive injection molding material 601 fills a portion except for a space S1 surrounding the at least one conductive pad 1110 is formed, and the at least one conductive pad 1110 may be electrically connected to the printed circuit board 340 through at least one signal connection pin 1120.

According to certain embodiments, the electronic device may further include a printed circuit board 340 disposed on one surface of the support member 411, wherein a conductive pad 1210 may be formed on one surface of the first fingerprint sensor 500, the non-conductive injection molding material 601 may be filled in a portion except for a space S2 in which the conductive pad 1210, the conductive pad 1210 may be connected to a first end of the signal connection member 1010 through a conductive adhesive 1220, and a second end of the signal connection member 1010 may be electrically connected to the printed circuit board 340.

According to certain embodiments, the electronic device may further include a housing forming an exterior of the electronic device, the housing comprising a side member, a third hole 421 formed in the side member 310, and a second fingerprint sensor (e.g., the fingerprint sensor 500 in FIG. 13) disposed in the third hole 421, wherein the side member 310 and the second fingerprint sensor may be integrally joined through the non-conductive injection molding material 601.

According to certain embodiments, the side member 310 may have at least one fourth hole 431 formed to be spaced apart from the third hole 421, and the non-conductive injection molding material 601 may be filled in the at least one fourth hole 431.

According to certain embodiments, the side member 310 may have a colored region 1410 configured to identify a region where the second fingerprint sensor is disposed.

According to certain embodiments, the side member 310 may have a concave region 1420 configured to identify a region where the second fingerprint sensor is disposed.

According to certain embodiments, the side member 310 may have a convex region 1430 configured to identify a region where the second fingerprint sensor is disposed.

According to certain embodiments, a method comprises disposing a fingerprint sensor 500 on one surface of the first mold 610, and disposing a support member 411 disposed inside the second mold 620, the support member 411 having a first hole 420 formed therein, closing the first mold 610 and the second mold 620, inserting non-conductive injection molding material in the first mold and the second mold between the fingerprint sensor 500 and the support member 411.

According to certain embodiments, the support member 411 may have at least one protrusion 422 protruding toward an inside of the first hole 420, the fingerprint sensor 500 may have at least one notch 522 formed at a position corresponding to the at least one protrusion 422, and the non-conductive injection molding material 601 may be filled between the at least one protrusion 422 and the at least one notch 522.

According to certain embodiments, the support member 411 may have at least one second hole 430 formed to be spaced apart from the first hole 420, and the at least one second hole 430 may be filled with the non-conductive injection molding material 601.

According to certain embodiments, the method further comprises disposing a printed circuit board 340 on one surface of the support member 411, wherein an inserting the non-conductive injection molding material around a signal connection member 1010 connecting the printed circuit board to the fingerprint sensor.

According to certain embodiments, the signal connection member 1010 may be coated with a heat-resistant film 1015 in a portion contacting the non-conductive injection molding material 601.

Although the disclosure has been described hereinbefore according to certain embodiments, it will be well understood by a person skilled in the art that various changes and modifications can be made without departing from the scope of the disclosure.

While the foregoing description has been shown and described with reference to certain embodiments, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

The invention claimed is:

1. An electronic device comprising:
   a display;
   a support member having a first hole and configured to support the display;
   a first fingerprint sensor disposed in the first hole such that there is a space between the first fingerprint sensor and the support member forming a perimeter around the first fingerprint sensor, wherein the first fingerprint sensor has a top surface facing the display, and a bottom surface opposite to the top surface;
   a non-conductive injection molding material bonding the first fingerprint sensor to the support member, wherein the non-conductive injection molding material fills the space between the first fingerprint sensor and the support member and covering the bottom surface of the first fingerprint sensor; and
   a printed circuit board disposed on one surface of the support member, wherein the first fingerprint sensor is connected to the printed circuit board through a signal connection member, and a portion of the signal connection member is embedded in the non-conductive injection molding material,
   wherein the first fingerprint sensor comprises a plurality of sensing pixels and an elastic member, and
   wherein the elastic member is disposed under the display such that an air gap is formed between the display and the plurality of sensing pixels.

2. The electronic device of claim 1, wherein the support member has at least one protrusion toward an inside of the first hole,
   the first fingerprint sensor has at least one notch formed at a position corresponding to the at least one protrusion, and
   the non-conductive injection molding material is filled between the at least one protrusion and the at least one notch.

3. The electronic device of claim 1, wherein the first fingerprint sensor has at least one groove filled with the non-conductive injection molding material.

4. The electronic device of claim 1, wherein the first fingerprint sensor includes an optical fingerprint sensor or a lens-type fingerprint sensor.

5. The electronic device of claim 1, wherein the support member has at least one second hole formed to be spaced apart from the first hole, and
   the at least one second hole is filled with the non-conductive injection molding material.

6. The electronic device of claim 1, further comprising heat-resistance film coating the portion of the signal connection member contacting the non-conductive injection molding material.

7. The electronic device of claim 1, further comprising:
   at least one conductive pad formed on the bottom surface of the first fingerprint sensor,
   wherein the non-conductive injection molding material covers the bottom surface of the first fingerprint sensor, except for a space surrounding the at least one conductive pad, and
   wherein the at least one conductive pad is electrically connected to the printed circuit board through at least one signal connection pin.

8. The electronic device of claim 1, further comprising:
   a conductive pad formed on the bottom surface of the first fingerprint sensor,
   wherein the non-conductive injection molding material covers the bottom surface, except for a space surrounding the conductive pad,
   the conductive pad is connected to a first end of the signal connection member through a conductive adhesive, and a second end of the signal connection member is electrically connected to the printed circuit board.

9. The electronic device of claim 1, further comprising:
   a housing forming an exterior of the electronic device, the housing comprising a side member;
   a third hole formed in the side member; and
   a second fingerprint sensor disposed in the third hole,
   wherein the side member and the second fingerprint sensor are integrally joined through the non-conductive injection molding material.

10. The electronic device of claim 9, wherein the side member has at least one fourth hole formed to be spaced apart from the third hole, and
    the non-conductive injection molding material is filled in the at least one fourth hole.

11. The electronic device of claim 9, wherein the side member has a colored region configured to identify a region where the second fingerprint sensor is disposed.

12. The electronic device of claim 9, wherein the side member has a concave region configured to identify a region where the second fingerprint sensor is disposed.

13. The electronic device of claim 9, wherein the side member has a convex region configured to identify a region where the second fingerprint sensor is disposed.

14. A method comprising:
    disposing a fingerprint sensor on one surface of a first mold, wherein the fingerprint sensor has a top surface facing the first mold, and a bottom surface opposite to the top surface; and
    disposing a support member inside a second mold, the support member having a first hole formed therein and configured to support a display,
    closing the first mold and the second mold, thereby forming a space between the fingerprint sensor and the support member that forms a perimeter around the fingerprint sensor;

inserting non-conductive injection molding material in the first mold and the second mold, thereby filing the space between the fingerprint sensor and the support member and bonding the fingerprint sensor to the support member and covering the bottom surface; and disposing a printed circuit board on one surface of the support member, wherein the fingerprint sensor is connected to the printed circuit board through a signal connection member, and a portion of the signal connection member is embedded in the non-conductive injection molding material, wherein the fingerprint sensor comprises a plurality of sensing pixels and an elastic member, and wherein the elastic member is disposed under the display such that an air gap is formed between the display and the plurality of sensing pixels.

15. The method of claim 14, wherein the support member has at least one protrusion protruding toward an inside of the first hole, the fingerprint sensor has at least one notch formed at a position corresponding to the at least one protrusion, and the non-conductive injection molding material is filled between the at least one protrusion and the at least one notch.

16. The method of claim 14, wherein the support member has at least one second hole formed to be spaced apart from the first hole, and wherein inserting the non-conductive injection molding material comprises filling the at least one second hole with the non-conductive injection molding material.

17. The method of claim 14, wherein the portion of the signal connection member contacting the non-conductive injection molding material is coated with a heat-resistant film.

* * * * *